(12) United States Patent
Ahmed et al.

(10) Patent No.: US 10,652,752 B2
(45) Date of Patent: *May 12, 2020

(54) CONTROLLER CONTROLLING A HYBRID NODE TO OPERATE AS ONE OF A FIRST GROUP OF NODES OR AS ONE OF A SECOND GROUP OF NODES OF A WIRELESS NETWORK

(71) Applicant: Facebook, Inc., Menlo Park, CA (US)

(72) Inventors: Nabeel Ahmed, San Jose, CA (US); Djordje Tujkovic, Mountain View, CA (US); Sanjai Kohli, Manhattan Beach, CA (US)

(73) Assignee: Facebook, Inc., Menlo Park, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/210,316

(22) Filed: Dec. 5, 2018

(65) Prior Publication Data

US 2019/0123969 A1  Apr. 25, 2019

Related U.S. Application Data

(63) Continuation of application No. 15/338,338, filed on Oct. 29, 2016, now Pat. No. 10,181,980.

(51) Int. Cl.
| | |
|---|---|
| *H04W 16/10* | (2009.01) |
| *H04W 72/08* | (2009.01) |
| *H04W 40/16* | (2009.01) |
| *H04W 72/04* | (2009.01) |
| *H04W 84/00* | (2009.01) |
| *H04L 12/24* | (2006.01) |

(52) U.S. Cl.
CPC ......... *H04W 16/10* (2013.01); *H04L 41/0893* (2013.01); *H04W 40/16* (2013.01); *H04W 72/0446* (2013.01); *H04W 72/082* (2013.01); *H04W 84/00* (2013.01)

(58) Field of Classification Search
CPC .... H04L 41/12; H04L 41/0816; H04W 16/10; H04W 72/082; H04W 84/18–22
See application file for complete search history.

(56) References Cited

U.S. PATENT DOCUMENTS

| | | | |
|---|---|---|---|
| 9,363,651 B1 | 6/2016 | daCasta | |
| 10,181,980 B2 * | 1/2019 | Ahmed | ................... H04L 41/12 |
| 2005/0232179 A1 | 10/2005 | daCasta | |
| 2006/0251115 A1 | 11/2006 | Haque et al. | |
| 2012/0188901 A1 | 7/2012 | Struhsaker et al. | |
| 2017/0111164 A1 | 4/2017 | Wyville | |

* cited by examiner

*Primary Examiner* — Hoon J Chung
(74) *Attorney, Agent, or Firm* — Brian R. Short (57) ABSTRACT

Apparatuses, methods, and systems for controlling a hybrid node are disclosed. A network includes a controller, a plurality of first nodes, wherein sectors of the plurality of first nodes are configured to simultaneously transmit wireless signals or receive wireless signals, a plurality of second nodes, wherein sectors of the plurality of second nodes are configured to simultaneously transmit wireless signals when all of the one or more sectors of the plurality of first nodes are receiving wireless signals, or receive wireless signals when all of the one or more sectors of the plurality of first nodes are transmitting wireless signals, and a plurality of hybrid nodes, wherein the controller is operative to select at least a subset of sectors of the plurality of hybrid nodes to operate as one of the plurality of first nodes or to operate as one of the plurality of second nodes.

20 Claims, 11 Drawing Sheets

CONTROLLER CONTROLLING A HYBRID NODE TO OPERATE AS ONE OF A FIRST GROUP OF NODES OR AS ONE OF A SECOND GROUP OF NODES OF A WIRELESS NETWORK

RELATED APPLICATIONS

This patent application is a continuation of U.S. patent application Ser. No. 15/338,338 filed Oct. 29, 2016, which is herein incorporated by reference.

FIELD OF THE DESCRIBED EMBODIMENTS

The described embodiments relate generally to wireless communications. More particularly, the described embodiments relate to systems, methods and apparatuses for controlling operation of a hybrid node of a wireless network.

BACKGROUND

Multi-hop wireless networks include multiple nodes wherein wireless links are formed between the nodes. Multi-hop networks are susceptible to self-interference between the links of the nodes of the multi-hop networks. Multi-hop wireless networks that include a single transmission channel can be particularly susceptible.

It is desirable to have methods, apparatuses, and systems for controlling a hybrid node within multi-hop wireless networks.

SUMMARY

An embodiment includes a wireless network. The wireless network includes a controller, a plurality of first nodes, wherein each of the plurality of first nodes includes one or more sectors, and wherein all of the one or more sectors of the plurality of first nodes are configured to simultaneously transmit wireless signals or receive wireless signals. The wireless network further includes a plurality of second nodes, wherein each of the plurality of second nodes includes one or more sectors, and wherein all of the one or more sectors of the plurality of second nodes are configured to simultaneously transmit wireless signals when all of the one or more sectors of the plurality of first nodes are receiving wireless signals, or receive wireless signals when all of the one or more sectors of the plurality of first nodes are transmitting wireless signals. The wireless network further includes a plurality of hybrid nodes, wherein each of the plurality of hybrid nodes includes one or more sectors, wherein the controller selects at least a subset of sectors of the plurality of hybrid nodes to operate as one of all of the one or more sectors of the plurality of first nodes or to operate as one of all of the one or more sectors of the plurality of second nodes.

Another embodiment includes a method. The method includes operating a plurality of first nodes of a wireless network, wherein each of the plurality of first nodes includes one or more sectors, and wherein all of the one or more sectors of the plurality of first nodes are configured to simultaneously transmit wireless signals or receive wireless signals, operating a plurality of second nodes, wherein each of the plurality of second nodes includes one or more sectors, and wherein all of the one or more sectors of the plurality of second nodes are configured to simultaneously transmit wireless signals when all of the one or more sectors of the plurality of first nodes are receiving wireless signals, or receive wireless signals when all of the one or more sectors of the plurality of first nodes are transmitting wireless signals, and controllably operating a plurality of hybrid nodes, wherein each of the plurality of hybrid nodes includes one or more sectors, wherein a controller selects at least a subset of sectors of the plurality of hybrid nodes to operate as one of all of the one or more sectors of the plurality of first nodes or to operate as one of all of the one or more sectors of the plurality of second nodes.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for controlling a hybrid node of a wireless network. For at least some embodiments, the wireless network includes a plurality of first nodes, wherein each of the plurality of first nodes includes one or more sectors, and wherein all of the one or more sectors of the plurality of first nodes are configured to simultaneously transmit wireless signals or receive wireless signals. Further, the wireless network includes a plurality of second nodes, wherein each of the plurality of second nodes includes one or more sectors, and wherein all of the one or more sectors of the plurality of second nodes are configured to simultaneously transmit wireless signals when all of the one or more sectors of the plurality of first nodes are receiving wireless signals, or receive wireless signals when all of the one or more sectors of the plurality of first nodes are transmitting wireless signals. Further, the wireless network includes a plurality of hybrid nodes, wherein each of the plurality of hybrid nodes includes one or more sectors, wherein at least a subset of sectors of the plurality of hybrid nodes are controllably selected to operate as one of all of the one or more sectors of the plurality of first nodes or to operate as one of all of the one or more sectors of the plurality of second nodes.

Figure 1:
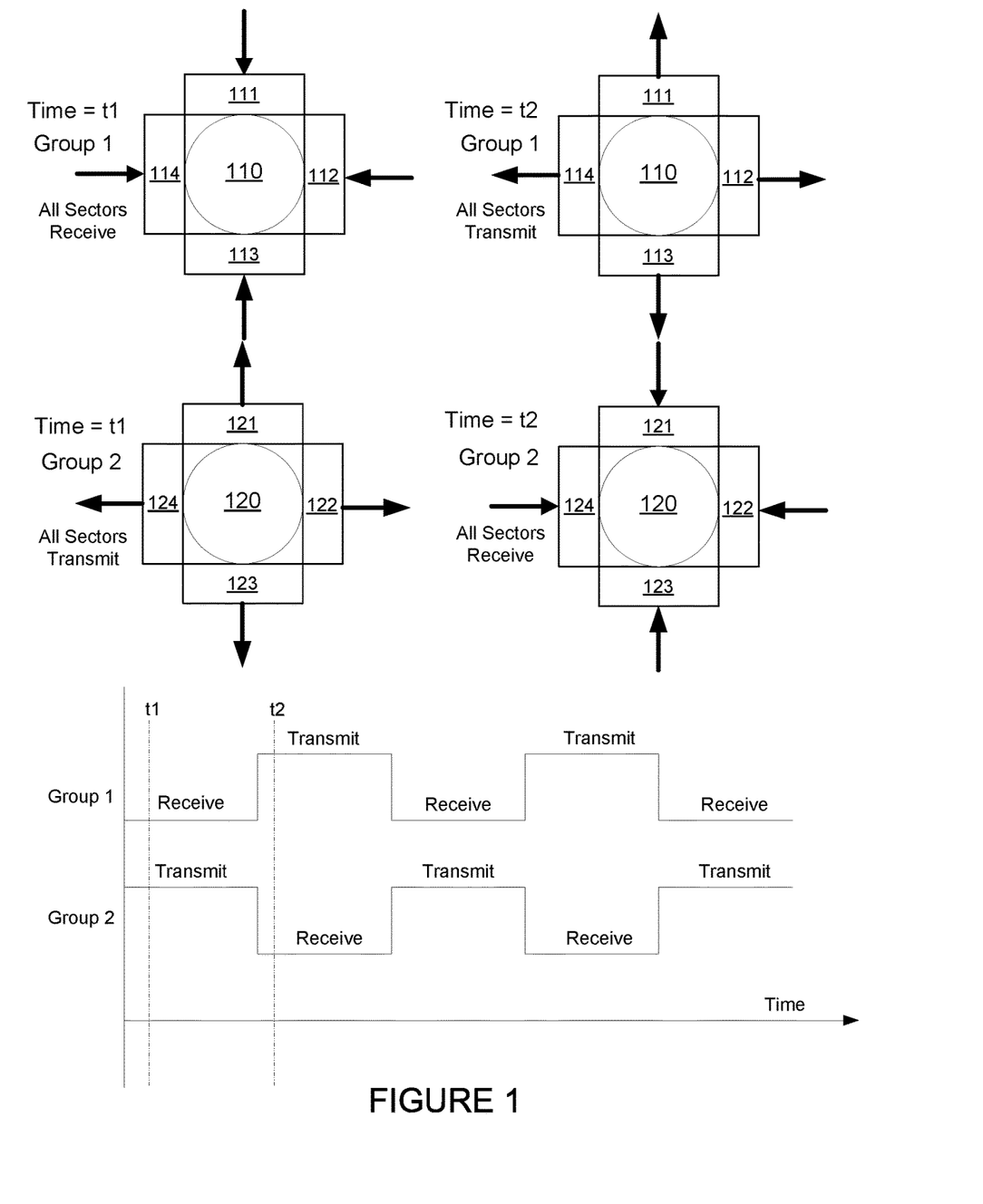
FIG. 1 shows a node of a first group of nodes and a node of a second group of nodes of a wireless network, according to an embodiment.

FIG. 1 shows a node 110 of a first group of nodes and a node 120 of a second group of nodes of a wireless network, according to an embodiment. As shown, the node 110 includes a plurality of sectors 111, 112, 113, 114, and the node 120 includes a plurality of sectors 121, 122, 123, 124. For an embodiment, each sector includes a radio. For an embodiment, at least one of the sectors includes a plurality of antennas. For an embodiment, at least one sector includes a plurality of antennas, and utilize beam forming to direct wireless signals transmitted from the sector.

While the nodes are shown as having a plurality of sectors, for at least one embodiment, one or more of the nodes includes one sector, and wireless signals are omni-directionally transmitted or received by the one sector.

As shown, at a first time t1, the first node 110 of the first group of nodes of the wireless network is operational to receive wireless signal simultaneously at all sectors 111, 112, 113, 114. Further, at the first time t1, the second node 120 of the second group of nodes of the wireless network is operational to transmit wireless signals simultaneously at all sectors 121, 122, 123, 124.

Further, at a second time t2, the first node 110 of the first group of nodes of the wireless network is operational to transmit wireless signal simultaneously at all sectors 111, 112, 113, 114. Further, at the second time t2, the second node 120 of the second group of nodes of the wireless network is operational to receive wireless signals simultaneously at all sectors 121, 122, 123, 124.

For an embodiment, the wireless network includes a plurality of nodes in the first group, and a plurality of nodes in the second group. As shown by the time lines, for an embodiment, all of the one or more sectors of the plurality of second nodes are configured to simultaneously transmit wireless signals when all of the one or more sectors of the plurality of first nodes are receiving wireless signals, or receive wireless signals when all of the one or more sectors of the plurality of first nodes are transmitting wireless signals. By designating the nodes of the first group and nodes of the second group, and utilizing time division duplexing (TDD) of the transmission and reception of the nodes of the first and second groups, interference between nodes can be mitigated.

Figure 2:
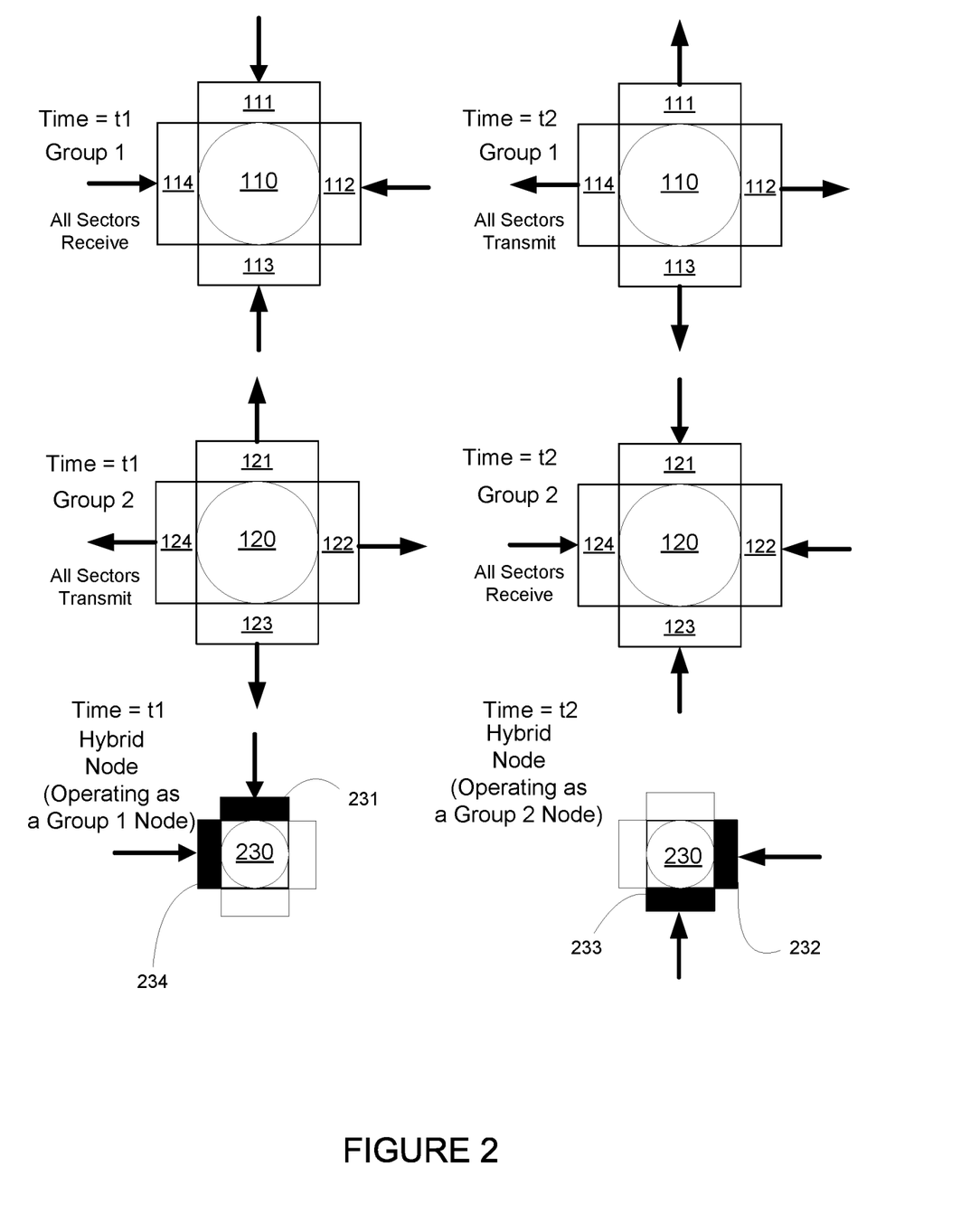
FIG. 2 shows a wireless network that includes a node of the first group of nodes, a node of the second group of nodes, and a hybrid node, according to an embodiment.

FIG. 2 shows a wireless network that includes the first node 110 of the first group of nodes, the second node 120 of the second group of nodes, and a hybrid node 230, according to an embodiment. For at least some embodiments, the hybrid node 230 is configured to be controllably selected to operate consistently with the first group of nodes or the second group of nodes. Further, for an embodiment, the hybrid node can be selected to operate in a null or de-activated state, wherein none of the sectors of the hybrid node 230 are transmitting or receiving.

For the first time t1, at least one of the sectors of the hybrid node 230 is selected to operate consistently with the operation of the nodes of the first group. As shown, sectors 231 and 234 of the hybrid node 230 receive wireless transmission simultaneously with the sectors 111, 112, 113, 114 of the first node 110 receiving wireless transmission.

For the second time t2, at least one of sector of the hybrid node 230 is selected to operate consistently with the operation of the nodes of the first group. As shown, sectors 232 and 233 of the hybrid node 230 receive wireless transmission simultaneously with the sectors 121, 122, 123, 124 of the second node 120 receiving wireless transmission.

Figure 3:
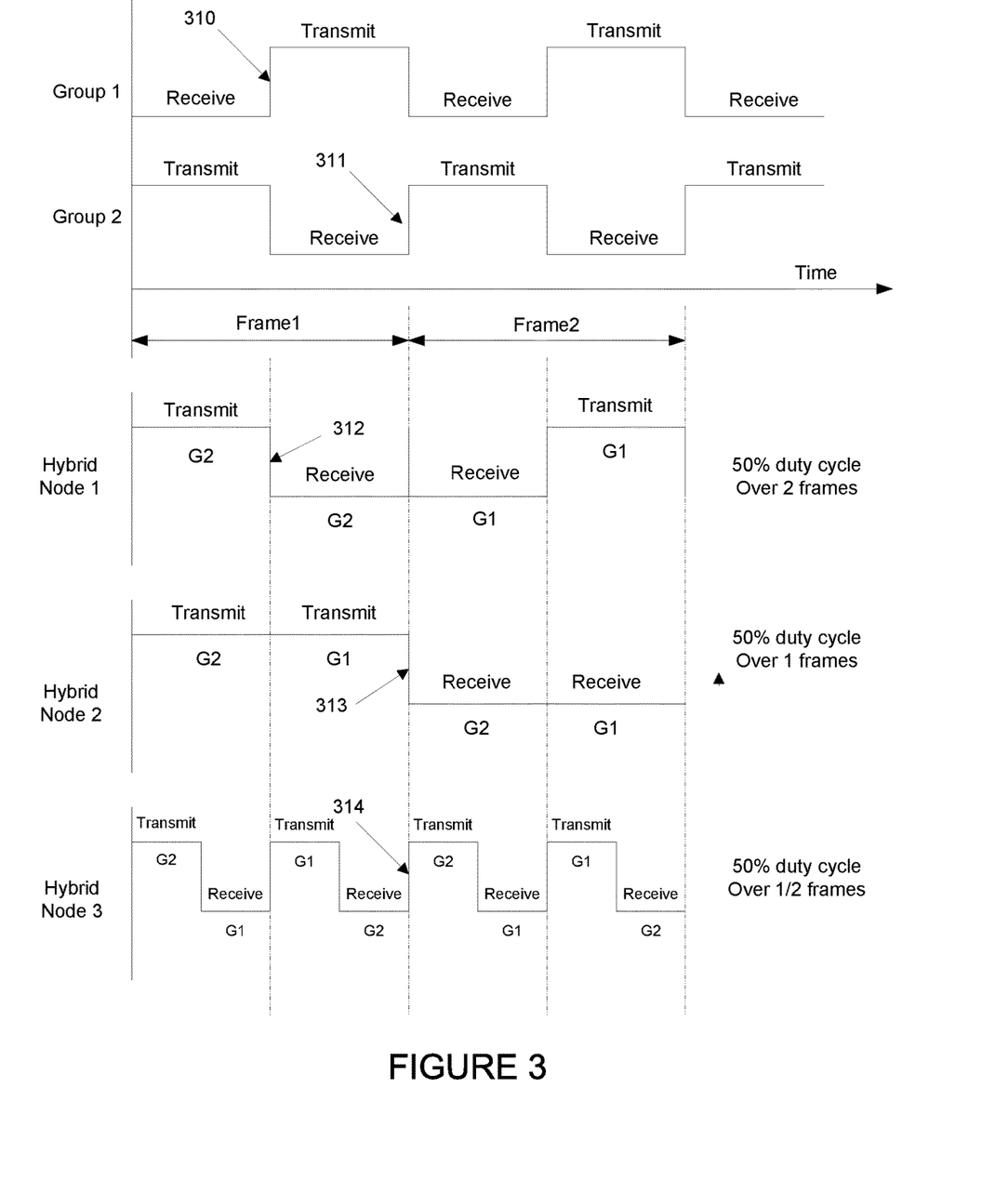
FIG. 3 shows times lines of operation of a first group of nodes, a second group of nodes, and hybrid nodes, according to an embodiment.

FIG. 3 shows times lines of operation of a first group of nodes, a second group of nodes, and hybrid nodes, according to an embodiment. The time line 310 depicts operation of the first group of nodes over time. As shown, all sectors of each node of the first group simultaneously receive and transmit wireless signal as indicated by the time line 310. A first frame of time (Frame 1) includes the first group of nodes receiving wireless signals for the first half of the Frame 1, and transmitting wireless signals for the second half of the Frame 1. Further, a second frame of time (Frame 2) includes the first group of nodes receiving wireless signals for the first half of the Frame 1, and transmitting wireless signals for the second half of the Frame 1.

The time line 311 depicts operation of the second group of nodes over time. As shown, all sectors of each node of the second group simultaneously receive and transmit wireless signal as indicated by the time line 311, and further, the second group of nodes transmit wireless signals while the first group of nodes receive wireless signals, and the second group of nodes receive wireless signals while the first group of nodes transmit wireless signals. The first frame of time (Frame1) includes the second group of nodes transmitting wireless signals for the first half of the Frame1, and receiving wireless signals for the second half of the Frame1. Further, a second frame of time (Frame2) includes the second group of nodes transmitting wireless signals for the first half of the Frame2, and receiving wireless signals for the second half of the Frame2.

The time lines 312, 313, 314 show possible controlled operation of the one or more hybrid nodes. A first hybrid control time line 312 shows the hybrid node being controlled to operate 50% of the time as a node of the second group of nodes, and 50% of the time as a node of the first group of nodes. More specifically, the hybrid node is controlled to operate like the nodes of the second group of nodes for the first frame of time (Frame1) and to operate like the nodes of the first group of nodes for the second frame of time (Frame2).

A second hybrid control time line 313 shows the hybrid node being controlled to operate 50% of the time as a node of the second group of nodes, and 50% of the time as a node of the first group of nodes. More specifically, the hybrid node is controlled to operate like the nodes of the second group of nodes for the first half of the first frame (Frame1) of time and to operate like the nodes of the first group of nodes for the second half of the first frame (Frame1) of time.

A third hybrid control time line 314 shows the hybrid node being controlled to operate 50% of the time as a node of the second group of nodes, and 50% of the time as a node of the first group of nodes. More specifically, the hybrid node is controlled to operate like the nodes of the second group of nodes for the first quarter of the first frame (Frame1) of time and to operate like the nodes of the first group of nodes for the second quarter of the first frame (Frame1) of time.

The different control line time lines 312, 313, 314 show that there is a great deal of flexibility in the timing of the control of the operation of the hybrid nodes. An embodiment includes controlling operation of a single hybrid node. An embodiment includes controlling operation of a plurality of hybrid nodes. For an embodiment, at least one hybrid node is controlled independent of control of at least one other hybrid node of the wireless network.

Figure 4:
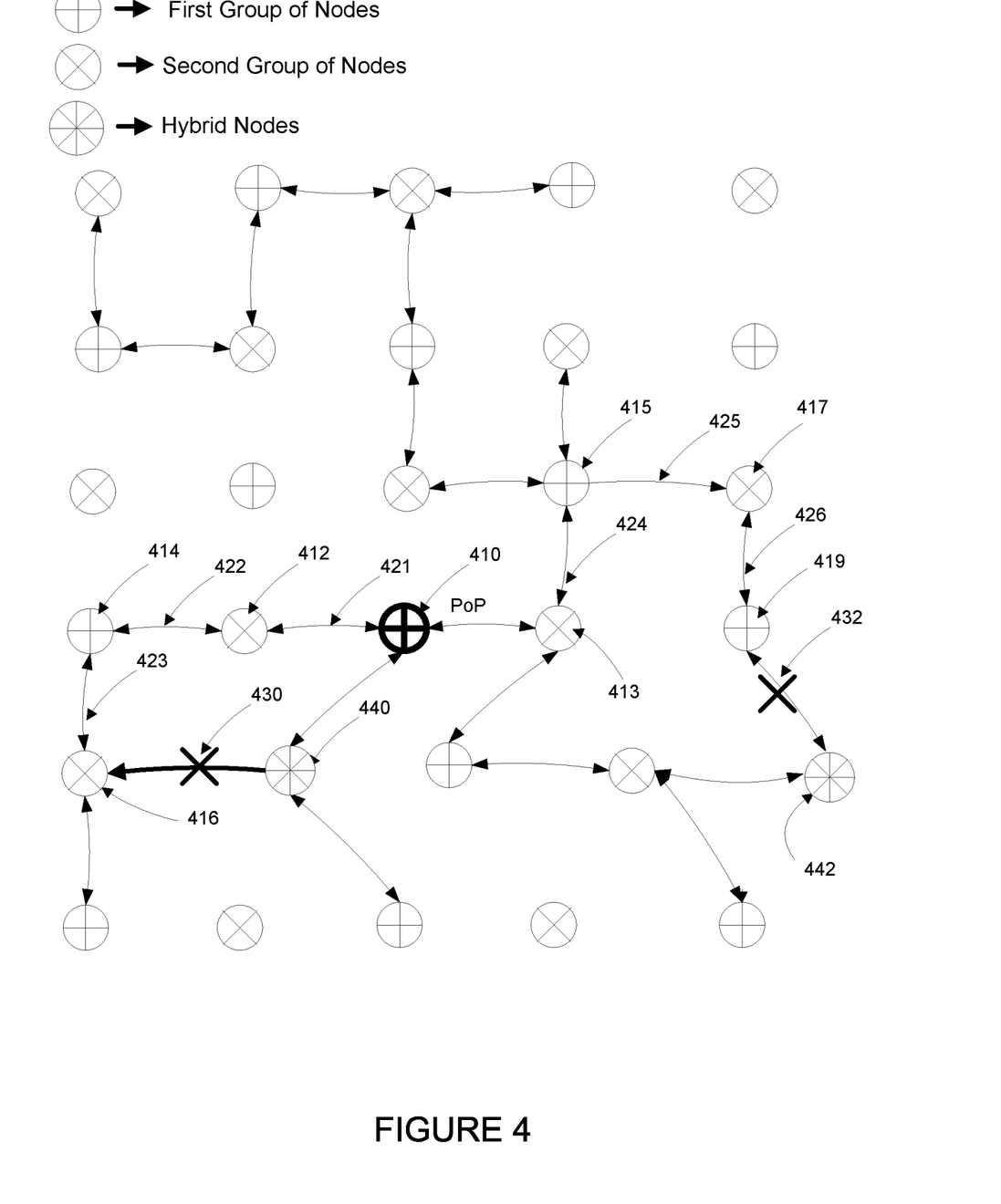
FIG. 4 shows a network topology of a wireless network that includes a first group of nodes and a second group of nodes, and wherein hybrid nodes are selected, according to an embodiment.

FIG. 4 shows a network topology of a wireless network that includes a first group of nodes and a second group of nodes, and wherein hybrid nodes are selected, according to another embodiment. For at least some embodiment, the topology of the wireless network includes the locations of the nodes, orientations of the nodes, and links between the nodes of the wireless network. Based on the network topology of the wireless network, each of the nodes of the wireless network is assigned to either the first group or the second group. FIG. 4 shows an example of first and second group assignments, and links between the assigned nodes.

As previously described, the nodes of the first group transmit wireless communication signals while the nodes of the second group receive wireless communication signals, and the nodes of the first group receive wireless communication signals while the nodes of the second group transmit wireless communication signals. Accordingly, the nodes of the first group of nodes naturally communicate with the nodes of the second group of nodes. However, problems form when a node of the first group attempts to communicate with another node of the first group, and when a node of the second group attempts to communicate with another node of the second group. When this situation arises, nodes can be converted into hybrid nodes.

In FIG. 4, a node 410 is a PoP (point of presence) that is connected though a backhaul (not shown) to a network. The node 410 is designated as belonging to the first group of nodes, and is linked (link 421) to node 412, which is designated as belonging to the second group. Further, node 412 is linked (link 422) to node 414 (a first group node), which is linked (link 423) to node 416 (a second group node). As long as first group nodes are connected to second group nodes, there are no problems. However, node 410 is also linked to node 440. Node 440 (a second group node) is linked (link 430) to node 416 which is a problem because both node 440 (shown as a hybrid node, but before being converted to a hybrid node, node 440 was a second group node) and node 416 are nodes of the second group. Therefore, for an embodiment, node 440 is converted to a hybrid node which can operate as either a node of the first group or as a node of the second group.

The node 410 is further linked to node 413, which is linked (link 424) to node 415, which is linked (link 425) to node 417, which is linked (link 426) to node 419. However, a link (link 432) between node 419 to node 442 is a problem because both node 419 and node 442 ((shown as a hybrid node, but before being converted to a hybrid node, node 442 was a first group node) are nodes of the first group. Accordingly, for an embodiment, the node 442 is converted to a hybrid node.

For an embodiment, hybrid nodes are designated by identifying which of the nodes of the wireless network of the obtained network topology have a link between them, and are both assigned to either the first group or the second group. Once the hybrid nodes have been designated, duty cycles of control of the hybrid nodes are adjustably selected to avoid communication links between the hybrid nodes and nodes of the first group when the hybrid node is controllably set to operate as a node of the first group, and to avoid communication links between the hybrid nodes and nodes of the second group when the hybrid node is controllably set to operate as a node of the second group.

Figure 5:
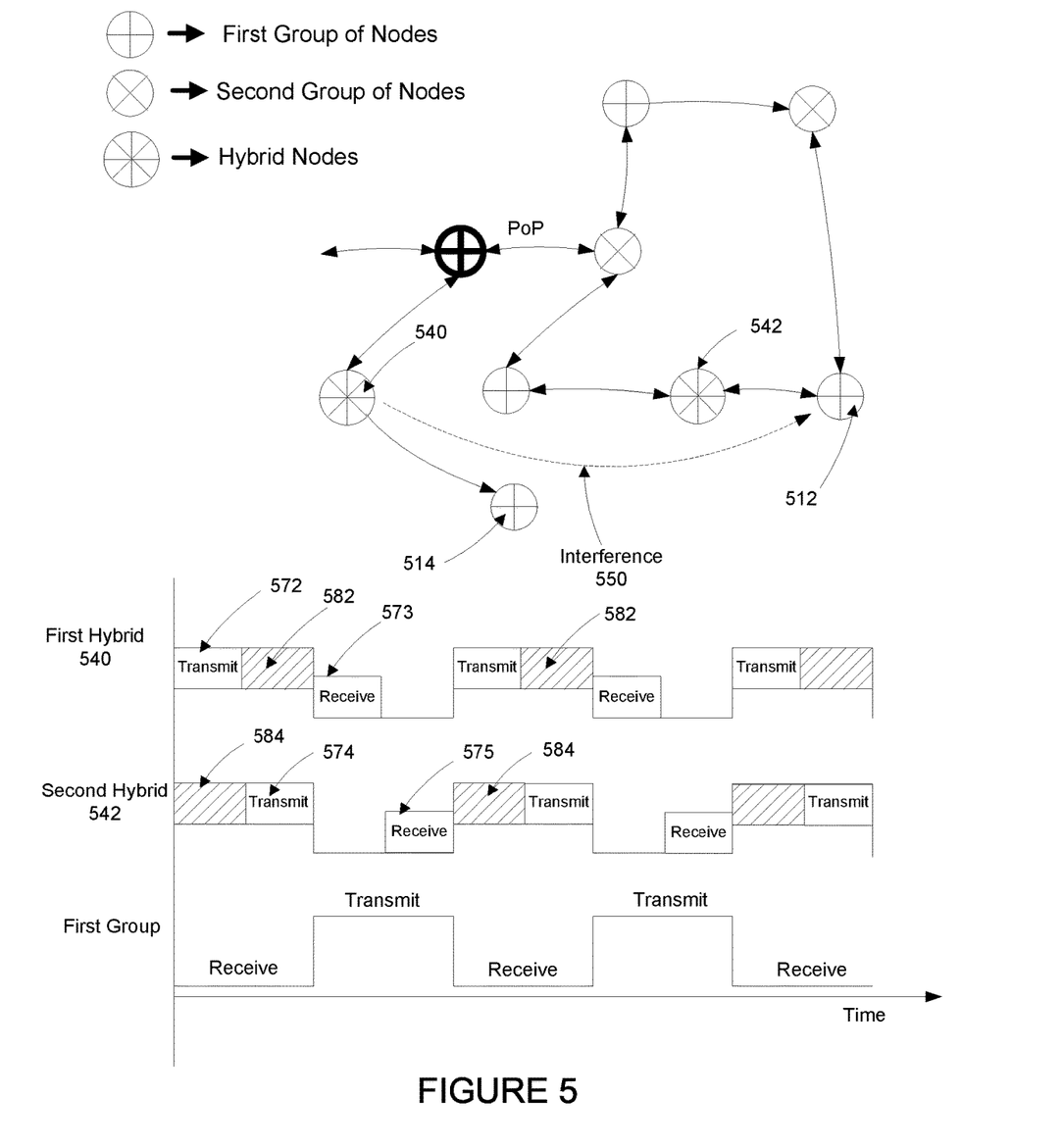
FIG. 5 shows a wireless network in which hybrid nodes are controlled to mitigate interference, according to another embodiment.

FIG. 5 shows a wireless network in which hybrid nodes are controlled to mitigate interference, according to another embodiment. As shown, a first hybrid node 540 is linked to a node 514 of the first group of nodes. Further, a second hybrid node 542 is linked to a node 512 also of the first group of nodes. If left uncontrolled, the wireless communication signals transmitted from the first hybrid node 540 to the node 514 can interfere (interference shown as 550) with wireless communication signals transmitted from the second hybrid node to the node 512.

Accordingly, to avoid wireless communication signals of one hybrid node interfering with wireless communication signals of another hybrid node, an embodiment includes controlling a duty cycle for at least one of the sectors of at least one of the hybrid nodes to mitigate interference within the wireless network. For an embodiment, this includes obtaining interference information of the wireless network, and adjusting the duty cycle of one or more hybrid nodes, to avoiding a single node of the first group or the second group from simultaneously receiving a signal from more than one hybrid node. That is, the hybrid nodes are controlled so that the one or more hybrid nodes do not simultaneously transmit as shown in FIG. 5.

The time lines of FIG. 5 show possible transmission timing of the first hybrid node 540 and the second hybrid node 542 to avoid the node 512 from receiving wireless signals from the first hybrid node 540 which is intended for the node 514. For an embodiment, the first hybrid node 540 is controlled to only transmit signals during a time duration 572, whereas the second hybrid node 542 is controlled to only transmit signals during a time duration 574. Additionally, as shown, time durations 582 show periods of time in which the first hybrid node 540 in inactive (does not transmit). Further, as shown, time durations 584 show periods of time in which the first hybrid node 540 in inactive (does not transmit). Accordingly, the first hybrid node 540 cannot interfere with the communication between the second hybrid node 542 and the node 512. For an embodiment, the duty cycle control of each of the hybrid nodes controls the transmission timing of the hybrid nodes.

Further, for an embodiment, the first hybrid node 540 is controlled to only receive signals during a time duration 573, whereas the second hybrid node 542 is controlled to only transmit signals during a time duration 575. For an embodiment, the duty cycle control of each of the hybrid nodes controls the reception timing of the hybrid nodes.

It is to be understood that the hybrid nodes 540, 542 can also be controlled to be idle. That is, the hybrid nodes 540, 542 can also be controlled to be not be transmitting or receiving.

For an embodiment, interference information is used to determine which hybrid nodes are controlled to avoid interference between the transmission signals of the hybrid nodes. The interference information can be sensed or measured by a receiving node. For an embodiment, the interference information is used to adjust a duty cycle of transmission of the hybrid nodes to avoid the transmission signals of the hybrid nodes from interfering with each other.

Figure 6:
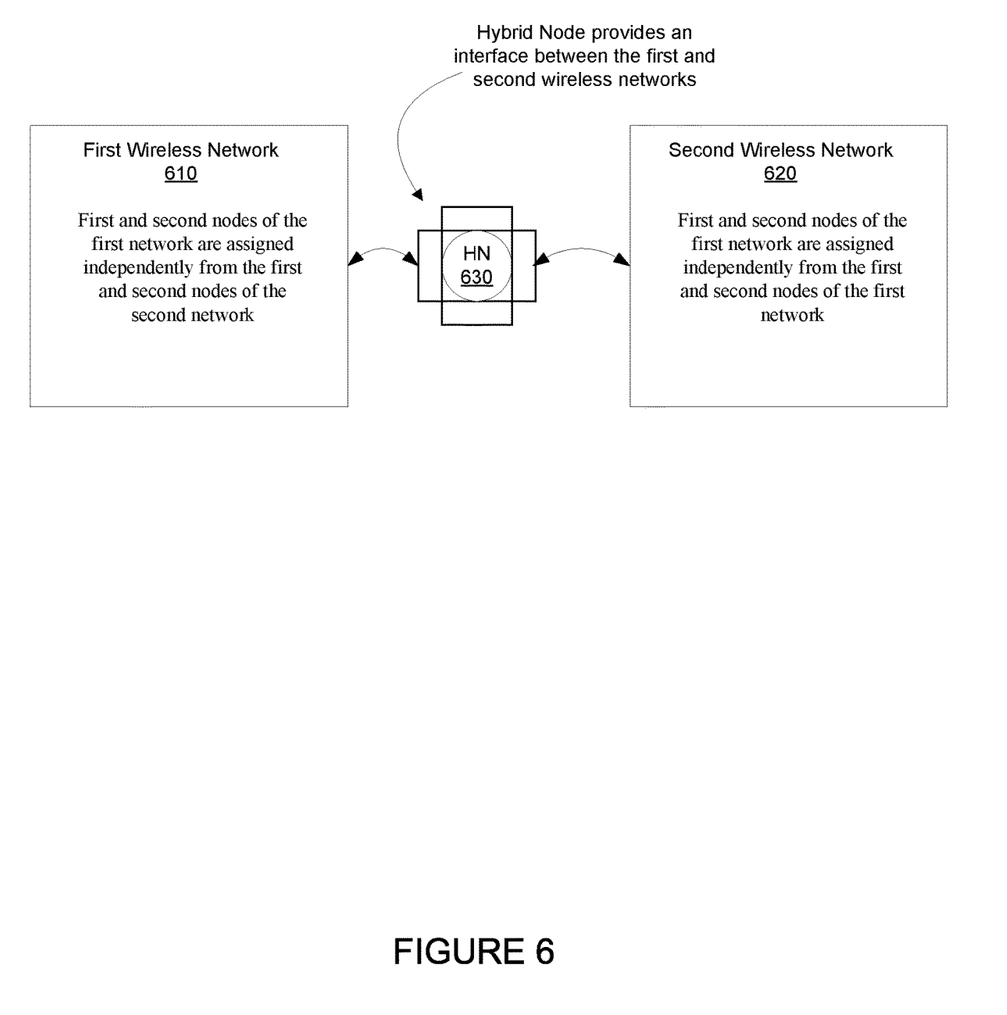
FIG. 6 shows a first wireless network, a second wireless network, and a hybrid node connecting the first wireless network and the second wireless network, according to an embodiment.

FIG. 6 shows a first wireless network, a second wireless network, and a hybrid node connecting the first wireless network and the second wireless network, according to another embodiment. As shown, for an embodiment, the wireless network includes at least a first network 610 that includes at least some of the plurality of first nodes and at least some of the plurality of the second nodes, and the wireless network includes a second network 620 that includes at least some of the plurality of first nodes and at least some of the plurality of the second nodes, wherein the first and second nodes of the first network are assigned independently from the first and second nodes of the second network, and wherein at least one of the hybrid nodes interconnects the first network and the second network. This configuration provides the option of merely connecting two existing networks, rather than having to go through a complete re-assignment of the first and second groups of nodes of both the first and second networks. Rather, the hybrid node 630 is inserted between the first network 610 and the second network 620, and the hybrid node 630 is controlled to enable the connection between the first network 610 and the second network 620.

Figure 7:
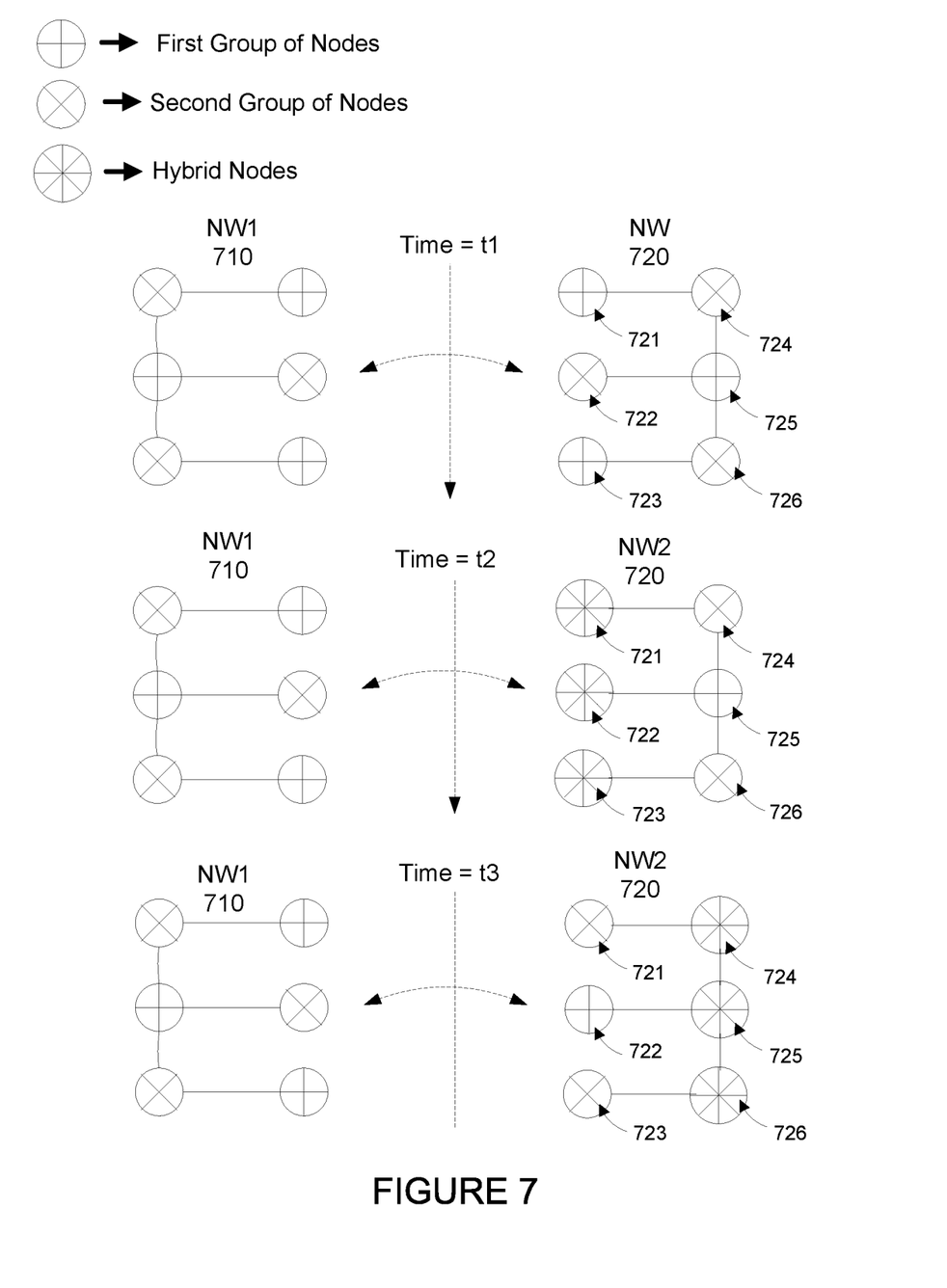
FIG. 7 shows a first wireless network, a second wireless network, wherein hybrid nodes are utilized to facilitate adaptive reconfiguration of one of the wireless networks, according to an embodiment.

FIG. 7 shows a first wireless network, a second wireless network, wherein hybrid nodes are utilized to facilitate adaptive reconfiguration of one of the wireless networks, according to an embodiment. For example, it may be desirable to interface a first network 710 with a second network 720. However, as shown in FIG. 7, at a time t1, the first group of nodes of the first network 710 may be proximate to the first group of nodes of the second network 720, and therefore, the first network 710 and the second network 720 may have node designations that make interfacing the first network 710 and the second network 720 difficult or inconvenient. As shown at the time t1, the first network 710 and the second network 720 would more readily connect with each other if, for example, the node designations of the second network 720 were reversed. That is, if the first group of nodes of the second network 720 were re-designated as the second group of nodes and the second group of nodes of the second network 720 were re-designated as the first group of nodes. However, such a major change in the designated roles of the nodes is a radical change that can have undesirable effects.

For at least some embodiments, hybrid nodes are utilized to facilitate adaptive reconfiguration of the wireless networks. For an embodiment, the nodes designated as hybrid nodes is gradually propagated across the network to facilitate a change in the roles of the nodes of the network, without requiring a radical, one-shot change of the roles which can be disruptive.

As shown, at time t2, the nodes 721, 722, 723 of the second network are converted to hybrid nodes to facilitate the connection between the first network 710 and the second network 720. Further, at time t3, the nodes 724, 725, 726 of the second network are converted to hybrid nodes. The conversion of nodes to hybrid nodes can be propagated across the second network 720 until the nodes of the second network 720 have the desired first and second node roles to allow interconnection with the first network 710.

Figure 8:
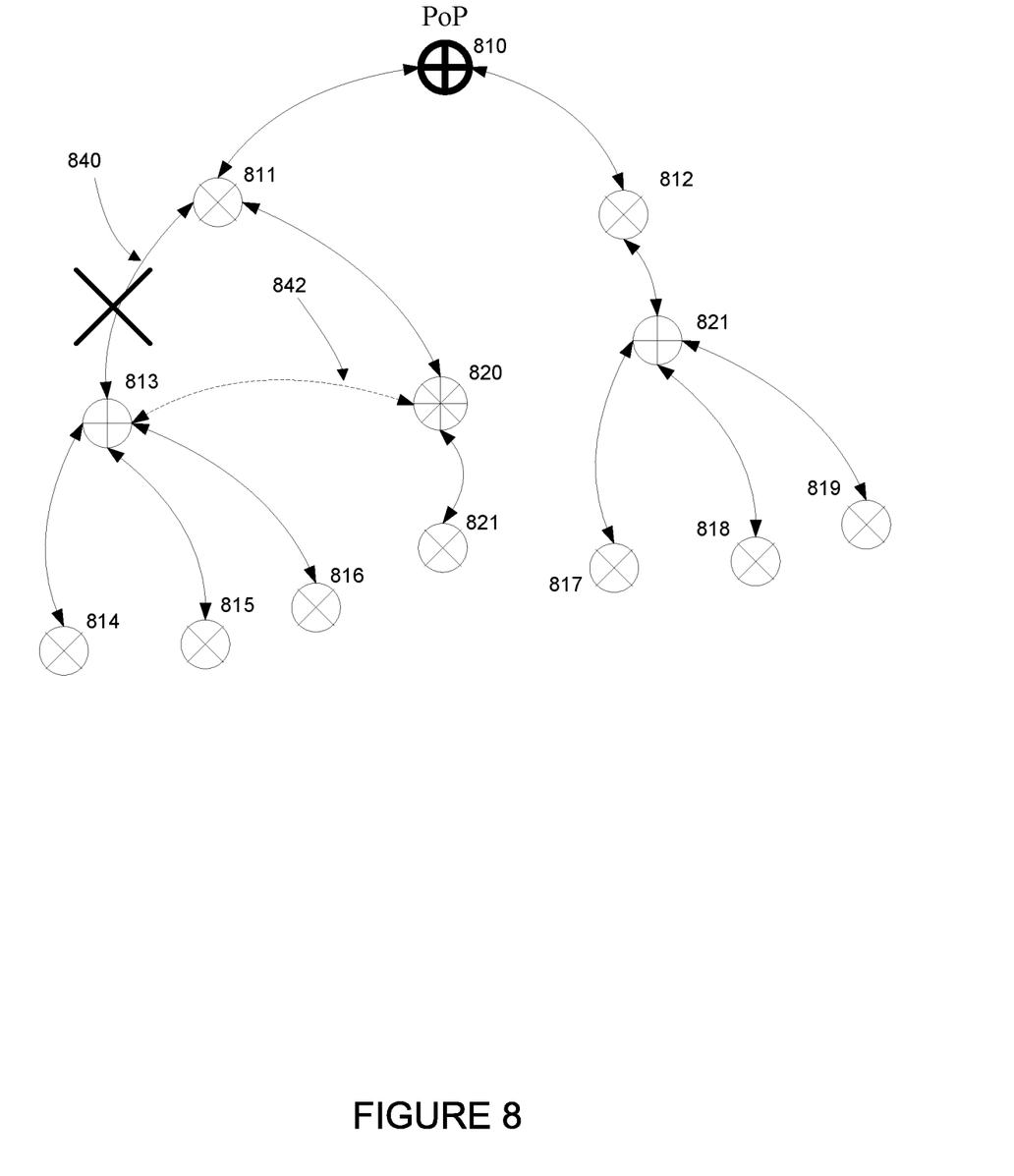
FIG. 8 shows a wireless network, wherein routing updates of the wireless network are aided with the help of a hybrid node, according to an embodiment.

FIG. 8 shows a wireless network, wherein routing updates of the wireless network are facilitated by a hybrid node, according to an embodiment. For an embodiment, a multi-hop wireless network selects routing paths through the wireless multi-hop network. The routing paths can be selected locally by the nodes themselves or the routing paths can be selected by a central controller. The routing paths can be stored in routing tables located at the nodes of the network. The routing paths can be defined by a routing tree.

FIG. 8 shows a node 810 (PoP) operative as a node of the first group of nodes. Further, FIG. 8 shows several routing paths between the nodes of the multi-hop wireless network that have been selected. For example, a routing path is formed between the node 810, node 813, and nodes 814, 815, 816. Further, another routing path is formed between node 810 and 820. Further, another routing path is formed between node 810, node 812 and nodes 817, 818, 819. The set of routes can be represented by a routing tree. As depicted, generally the routes include an alternating pattern of nodes of the first group and nodes of the second group. That is, for example, the nodes 810, 813 are nodes of the first group, whereas nodes 811, 814, 815, 816 are nodes of the second group.

However, if a link of the routing tree fails, a situation can occur in which a first group of nodes or a second group of nodes need to interact in order to maintain a route from an upstream node to one or more downstream nodes. For example, if link 840 fails for some reason, the node 813 may only be able to access an upstream route to the node 810 through the node 820. However, node 813 and node 820 are both nodes of the first group. For an embodiment, a downstream node is a node that is reliant on another node (upstream) in order to maintain a data traffic connection to an external (upstream) network.

For an embodiment, a hybrid node is controlled to enable a new routing path. For example, the duty cycle of a hybrid node 820 can be adapted, enabling the node 820 to continue to service any existing downstream nodes (such as, node 821) of the node 820, and further, through the link 842, service nodes 813, 814, 815, 816 that become downstream nodes to the node 820 due to a routing change or update due to a failure (such as, failure of link 840) within the previously existing routing path. That is, based on an existing routing table and routing failures, the duty cycle of the hybrid node 820 is adapted to minimize the impact of a routing failure on the wireless network.

Figure 9:
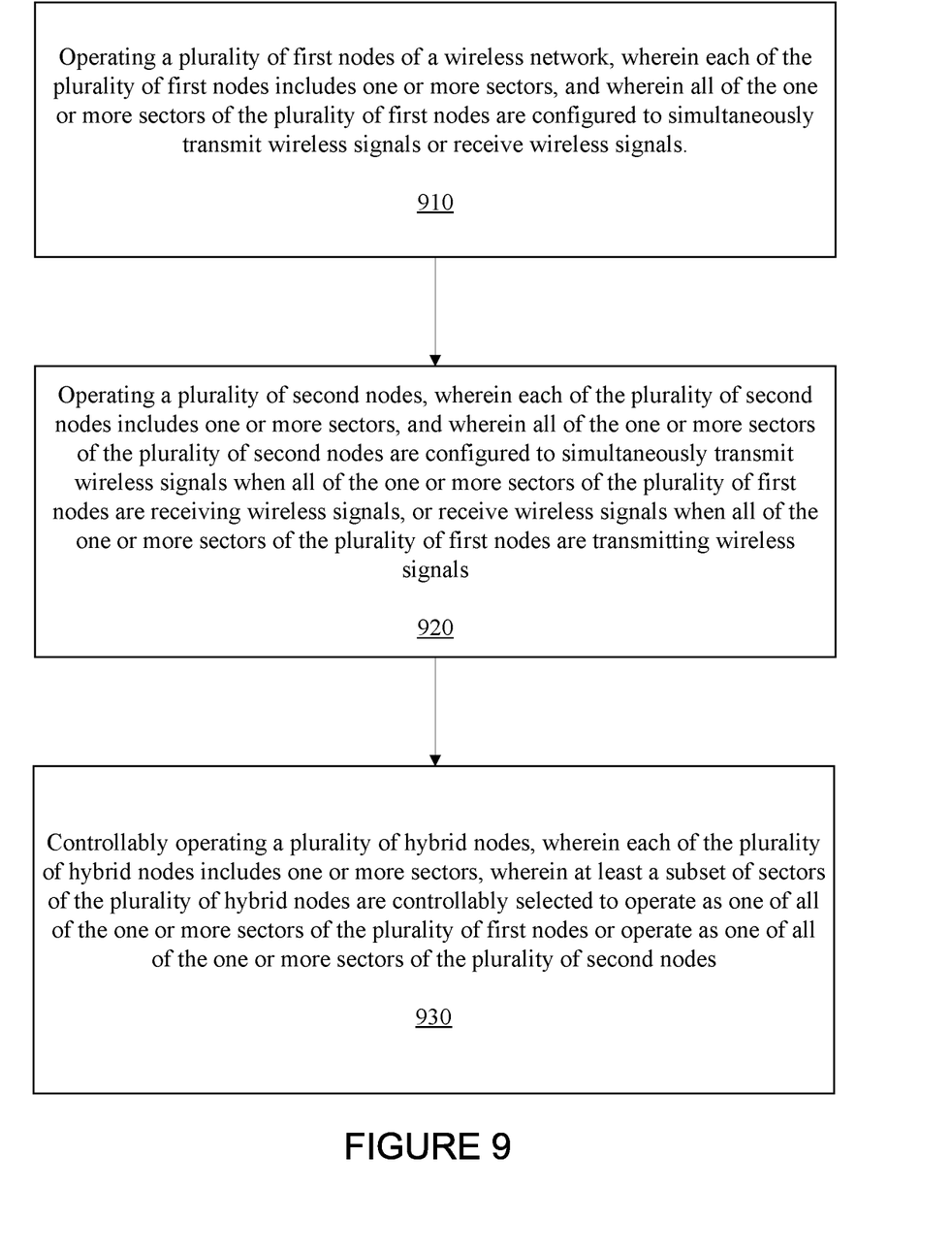
FIG. 9 is a flow chart that includes steps of a method, according to an embodiment.

FIG. 9 is a flow chart that includes steps of a method, according to an embodiment. A first step 910 includes operating a plurality of first nodes of a wireless network, wherein each of the plurality of first nodes includes one or more sectors, and wherein all of the one or more sectors of the plurality of first nodes are configured to simultaneously transmit wireless signals or receive wireless signals. A second step 920 includes operating a plurality of second nodes, wherein each of the plurality of second nodes includes one or more sectors, and wherein all of the one or more sectors of the plurality of second nodes are configured to simultaneously transmit wireless signals when all of the one or more sectors of the plurality of first nodes are receiving wireless signals, or receive wireless signals when all of the one or more sectors of the plurality of first nodes are transmitting wireless signals. A third step 930 includes controllably operating a plurality of hybrid nodes, wherein each of the plurality of hybrid nodes includes one or more sectors, wherein at least a subset of sectors of the plurality of hybrid nodes are controllably selected to operate as one of all of the one or more sectors of the plurality of first nodes or to operate as one of all of the one or more sectors of the plurality of second nodes.

An embodiment further includes controllably selecting the at least the subset of the sectors of the plurality of hybrid nodes to operate as one of all of the one or more sectors of the plurality of first nodes or to operate as one of all of the one or more sectors of the plurality of second nodes based on one or more conditions or parameters of the wireless network.

An embodiment further includes controllably selecting the at least the subset of the sectors of the plurality of hybrid nodes to operate as one of all of the one or more sectors of the plurality of first nodes or to operate as one of all of the one or more sectors of the plurality of second nodes based on a duty cycle. That is, the duty cycle controls whether the hybrid node is operating as a node of the first group of nodes or as a node of the second group of nodes. For an embodiment, the hybrid node can also be controllably set to an idle mode, wherein when in the idle mode, the hybrid node is not transmitting or receiving wireless signals. For an embodiment, the duty cycle is adjustable.

For at least some embodiments, the cycles of the hybrid nodes are centrally controlled. For an embodiment, the duty cycle for a hybrid node controls the amount of time one or more sectors of the hybrid node is in the first group of nodes, the amount of time it is in the second group of nodes, and the amount of time it is in idle mode.

For an embodiment, the duty cycle is adjustable based on a function of a number of client devices served through each link of the hybrid node. That is, the number of downstream devices of each link of the hybrid node influences the duty cycle selection.

An embodiment includes obtaining a network topology including nodes of the wireless network, and links between the nodes. After obtaining the network topology, an embodiment includes assigning each of the nodes of the wireless network to either the first group or the second group. An embodiment further includes adjustably selecting the duty cycles of the hybrid nodes based on specific criteria such as the number of downstream nodes being served by each of link of the hybrid node. The communication of the hybrid nodes is controlled so as to avoid communication links between the hybrid nodes and nodes of the first group when the hybrid node is controllably set to operate as a node of the first group, and to avoid communication links between the hybrid nodes and nodes of the second group when the hybrid node is controllably set to operate as a node of the second group.

For an embodiment, adjusting the duty cycle of the sectors of at least one of the hybrid nodes includes obtaining interference information of the wireless network, and adjusting the duty cycle of one or more hybrid nodes, to avoiding a single node of the first group or the second group from simultaneously receiving a signal from more than one hybrid node. For an embodiment, the interference information provides an indication that transmission signals of one hybrid node is interfering with transmission signals from another hybrid node. That is, a victim node is intentionally receiving communication signals from a first hybrid node, but is further receiving undesired communication signals from a second hybrid node. As shown in FIG. 5, the hybrid nodes can be further controlled to include idle states in which no signals are transmitted from the hybrid nodes. The timing of the idle states can be controlled to prevent, for example, the transmission signals of the second hybrid node from interfering with transmission signals of the first hybrid node.

For at least some embodiments, the wireless network includes at least a first network that includes at least some of the plurality of first nodes and at least some of the plurality of the second nodes, and the wireless network includes a second network that includes at least some of the plurality of first nodes and at least some of the plurality of the second nodes, wherein the first and second nodes of the first network are assigned independently from the first and second nodes of the second network, and wherein at least one of the hybrid nodes interconnects the first network and the second network. As previously described, the embodiment provides the option of merely connecting two existing networks, rather than having to go through a complete re-assignment of the first and second groups of nodes of both the first and second networks. Rather, a hybrid node is placed between the first network and the second network, and the hybrid node is controlled to enable the connection between the first network and the second network.

For at least some embodiments, the determination of which nodes of the wireless network belong to the first plurality of nodes and which nodes of the wireless network belong to the second plurality of nodes is adaptively reconfigured over time. Further, a designation of which of the nodes are hybrid nodes is temporary to aid the adaptive reconfiguration. For example, if one or more nodes are added to a wireless multi-hop network, it may become desirable to re-assign the nodes of the wireless multi-hop network to the first and second groups. However, a complete re-assignment of the nodes in one shot is potentially disruptive. This embodiment includes gradually implementing a node re-assignment with hybrid node assignments that ripple through or across the wireless multi-hop network.

At least some embodiment includes reassigning nodes of the wireless network operating as the first plurality of nodes, as the second plurality of nodes, or as the plurality of hybrid nodes when a routing distribution tree of the nodes of the wireless network changes. As previously described, if a link of the routing tree of the multi-hop wireless network fails, a situation can occur in which nodes of the first group or nodes of the second group need to interact in order to maintain a route from an upstream node to one or more downstream nodes. That is, based on an existing routing table and routing failures, the assignment of nodes is adapted to minimize the impact of a routing failure on the wireless network. For an embodiment, the node assignment includes assignment and control of a hybrid node.

Figure 10:
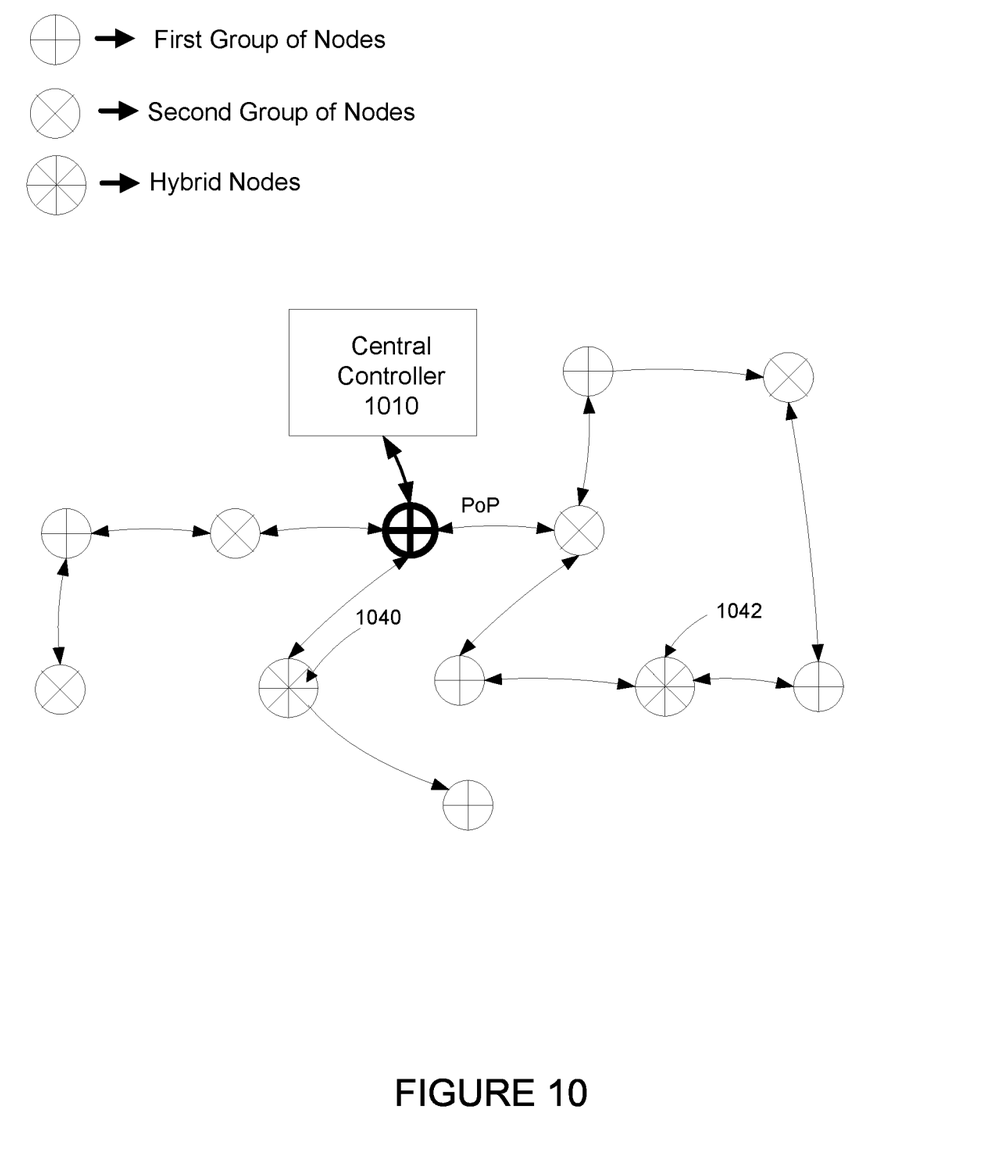
FIG. 10 shows a wireless network including a first group of nodes, a second group of nodes, hybrid nodes, and a central controller, according to an embodiment.

FIG. 10 shows a wireless network including a first group of nodes, a second group of nodes, hybrid nodes 1040, 1042, and a central controller 1010, according to an embodiment. For at least some embodiment, the central controller controls the operation of the hybrid nodes 1040, 1042. For an embodiment, the control is provided through a duty cycle that determines when the hybrid nodes are operating as the first group of nodes, the second group of nodes, or in an idle state. Further, for an embodiment, the central controller 1010 controllably sets the different nodes of the wireless network to be either nodes of the first group, nodes of the second group, or as hybrid nodes.

For at least some embodiments, the central controller 1010 controls the assignments of the nodes (that is, first group, second group, or hybrid). For at least some embodiments, the central controller 1010 controls the duty cycles of the hybrid nodes 1040, 1042. For at least some embodiments, the central controller 1010 performs or at least aid selections of routing paths through the wireless network. For at least some embodiments, the central controller 110 manages interference measurements or characterizations of the wireless multi-hop network. For at least some embodiments, the central controller 110 controls the hybrid nodes based at least in part on the interference measurements or characterization.

Figure 11:
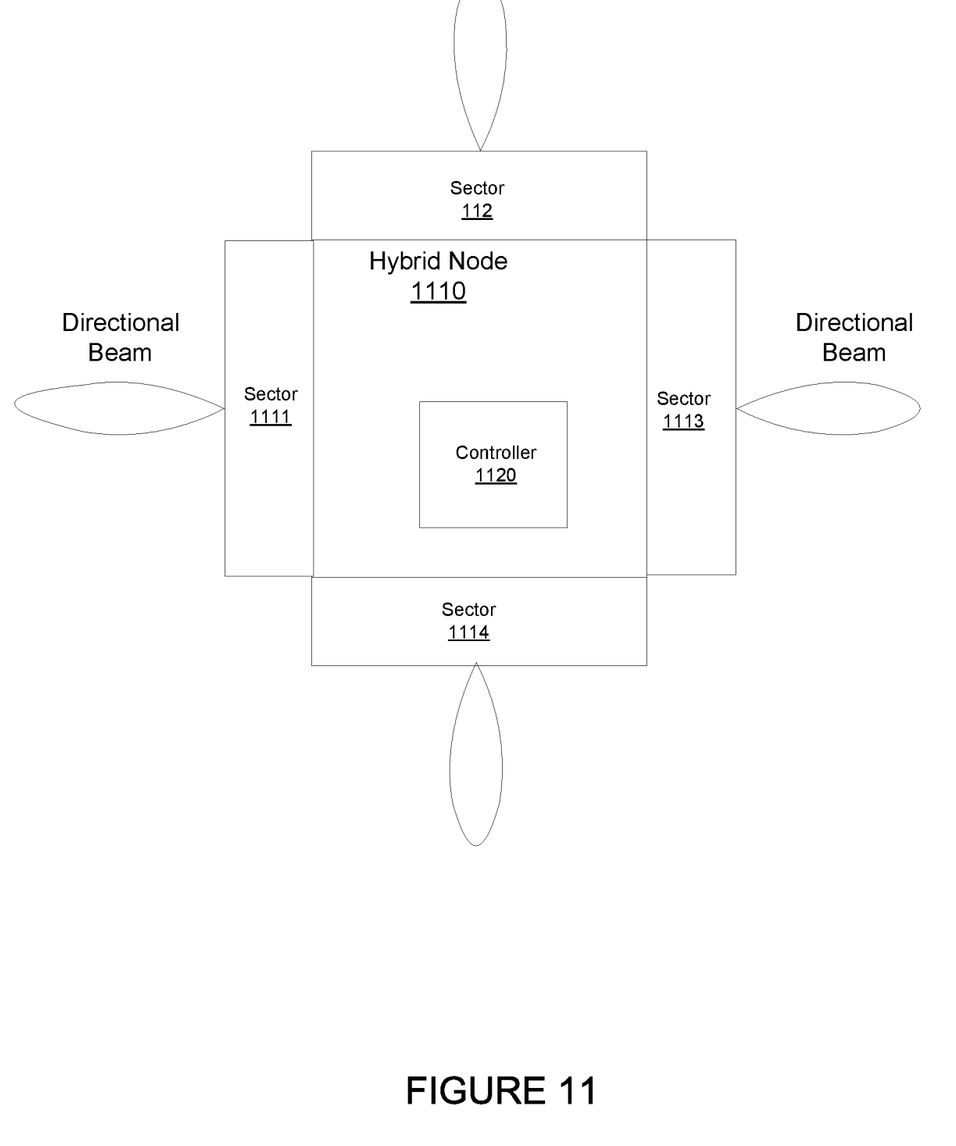
FIG. 11 shows a hybrid node, according to an embodiment.

FIG. 11 shows a hybrid node 1110, according to an embodiment. For an embodiment, the hybrid node 1110 includes multiple sectors 1111, 1112, 1113, 1114, wherein each sector includes a radio. For an embodiment, one or more sectors include multiple antennas, and transmit signals are focused or directed to an intended receiving sector of another node.

For at least some embodiments, a controller 1120 of the hybrid node 1110 receives control of the operation of the hybrid node 1110. For an embodiment, the received control determines whether the hybrid node 1110 is to operate as one of the first group of nodes, as one of the second group of nodes, or in an idle (not receiving or transmitting) mode. The controller 1120 manages the transmission and reception of the sectors of the hybrid node 1110.

For at least some embodiments, the controller 1120 of the hybrid node 1110 at least partially influences the operation of the hybrid node. That is, the hybrid node 1110 may receive control, but the hybrid node at least partially influences the control. For an embodiment, the control of the nodes of the wireless network is decentralized, and spread amongst controller of the nodes of the wireless network. That is, there is no central controller, but rather distributed control among the nodes of the wireless network.

Although specific embodiments have been described and illustrated, the embodiments are not to be limited to the specific forms or arrangements of parts so described and illustrated. The described embodiments are to only be limited by the claims.

What is claimed:

1. A wireless network, comprising:
    a central controller;
    a plurality of first nodes, wherein each of the plurality of first nodes includes one or more sectors, and wherein all of the one or more sectors of the plurality of first nodes are configured to one of only simultaneously transmit wireless signals or only simultaneously receive wireless signals;
    a plurality of second nodes, wherein each of the plurality of second nodes includes one or more sectors, and wherein all of the one or more sectors of the plurality of second nodes are configured to an other of only simultaneously transmit wireless signals when all of the one or more sectors of the plurality of first nodes are receiving wireless signals, or only simultaneously receive wireless signals when all of the one or more sectors of the plurality of first nodes are transmitting wireless signals; and
    a plurality of hybrid nodes, wherein each of the plurality of hybrid nodes includes one or more sectors;
    wherein the central controller is operative to select at least a subset of sectors of the plurality of hybrid nodes to operate as one of all of the one or more sectors of the plurality of first nodes or to operate as one of all of the one or more sectors of the plurality of second nodes.

2. The wireless network of claim 1, the controller is operative to select at least the subset of sectors of the plurality of hybrid nodes to operate as one of all of the one or more sectors of the plurality of first nodes or to operate as one of all of the one or more sectors of the plurality of second nodes based on one or more conditions or parameters of the wireless network.

3. The wireless network of claim 1, the controller is operative to select at least the subset of sectors of the plurality of hybrid nodes to operate as one of all of the one or more sectors the plurality of first nodes or to operate as one of all of the one or more sectors the plurality of second nodes based on a duty cycle.

4. The wireless network of claim 3, wherein the duty cycle is adjustable.

5. The wireless network of claim 4, wherein the duty cycle is adjustable based on a function of a number of client devices served through each link of the hybrid node.

6. The wireless network of claim 4, wherein the controller is further operative to:
    obtain a network topology including nodes of the wireless network, and links between the nodes;
    assign each of the nodes of the wireless network to either the first group or the second group;
    designate hybrid nodes including identifying which of the nodes of the wireless network of the obtained network topology have a link between them, and are both assigned to either the first group or the second group; and
    adjustably select the duty cycles of the hybrid nodes to avoid communication links between the hybrid nodes and nodes of the first group when the hybrid node is controllably set to operate as a node of the first group, and to avoid communication links between the hybrid nodes and nodes of the second group when the hybrid node is controllably set to operate as a node of the second group.

7. The wireless network of claim 4, wherein the duty cycle for the at least the subset of sectors of the plurality of hybrid nodes is adjustable to mitigate interference within the wireless network, comprising the controller is operative to:
    obtain interference information of the wireless network; and
    adjust the duty cycle of the at least the subset of sectors of the plurality of hybrid nodes, to avoiding a single node of the first group or the second group from simultaneously receiving a signal from more than one hybrid node.

8. The wireless network of claim 1, wherein the wireless network includes at least a first network that includes at least some of the plurality of first nodes and at least some of the plurality of the second nodes, and the wireless network includes a second network that includes at least some of the plurality of first nodes and at least some of the plurality of the second nodes, wherein the first and second nodes of the first network are assigned independently from the first and second nodes of the second network, and wherein at least one of the hybrid nodes interconnects the first network and the second network.

9. The wireless network of claim 1, wherein which nodes of the wireless network that belong to the first plurality of nodes and which nodes of the wireless network that belong to the second plurality of nodes is adaptively reconfigured over time, and one of more of the plurality of hybrid nodes are temporarily designated to aid the adaptive reconfiguration.

10. The wireless network of claim 1, further comprising reassigning nodes of the wireless network operating as the first plurality of nodes, as the second plurality of nodes, or as the plurality of hybrid nodes when a routing distribution tree of the nodes of the wireless network changes.

11. A method, comprising:
    operating a plurality of first nodes of a wireless network, wherein each of the plurality of first nodes includes one or more sectors, and wherein all of the one or more sectors of the plurality of first nodes are configured to one of only simultaneously transmit wireless signals or only simultaneously receive wireless signals;
    operating a plurality of second nodes, wherein each of the plurality of second nodes includes one or more sectors, and wherein all of the one or more sectors of the plurality of second nodes are configured to an other of only simultaneously transmit wireless signals when all of the one or more sectors of the plurality of first nodes are receiving wireless signals, or only simultaneously receive wireless signals when all of the one or more sectors of the plurality of first nodes are transmitting wireless signals; and
    controlling, by a central controller, operation of a plurality of hybrid nodes, wherein each of the plurality of hybrid nodes includes one or more sectors, wherein at least a subset of sectors of the plurality of hybrid nodes are controllably selected to operate as one of all of the one or more sectors of the plurality of first nodes or to operate as one of all of the one or more sectors of the plurality of second nodes.

12. The method of claim 11, further comprising selecting, by the central controller, the at least the subset of the sectors of the plurality of hybrid nodes to operate as one of all of the one or more sectors of the plurality of first nodes or to operate as one of all of the one or more sectors of the plurality of second nodes based on one or more conditions or parameters of the wireless network.

13. The method of claim 11, further comprising selecting, by the central controller, the at least the subset of the sectors of the plurality of hybrid to operate as one of all of the one or more sectors the plurality of first nodes or to operate as one of all of the one or more sectors the plurality of second nodes based on a duty cycle.

14. The method of claim 13, wherein the duty cycle is adjustable.

15. The method of claim 14, wherein the duty cycle is adjustable based on a function of a number of client devices served through each link of the hybrid node.

16. The method of claim 14, further comprising:
   obtaining, by the central controller, a network topology including nodes of the wireless network, and links between the nodes;
   assigning, by the central controller, each of the nodes of the wireless network to either the first group or the second group;
   designating, by the central controller, hybrid nodes including identifying which of the nodes of the wireless network of the obtained network topology have a link between them, and are both assigned to either the first group or the second group; and
   adjustably selecting, by the central controller, the duty cycles of the hybrid nodes to avoid communication links between the hybrid nodes and nodes of the first group when the hybrid node is controllably set to operate as a node of the first group, and to avoid communication links between the hybrid nodes and nodes of the second group when the hybrid node is controllably set to operate as a node of the second group.

17. The method of claim 14, further comprising adjusting, by the central controller, the duty cycle for the at least the subset of the sectors of the plurality of hybrid nodes comprising:
   obtaining, by the central controller, interference information of the wireless network; and
   adjusting, by the central controller, the duty cycle of the at least the subset of the sectors of the plurality of hybrid nodes, to avoiding a single node of the first group of the second group from simultaneously receiving a signal from more than one hybrid node.

18. The method of claim 11, wherein the wireless network includes at least a first network that includes at least some of the plurality of first nodes and at least some of the plurality of the second nodes, and the wireless network includes a second network that includes at least some of the plurality of first nodes and at least some of the plurality of the second nodes, wherein the first and second nodes of the first network are assigned independently from the first and second nodes of the second network, and wherein at least one of the hybrid nodes interconnects the first network and the second network.

19. The method of claim 11, wherein which nodes of the wireless network that belong to the first plurality of nodes and which nodes of the wireless network that belong to the second plurality of nodes is adaptively reconfigured over time and further comprising temporarily designating one or more of the plurality of hybrid nodes to aid the adaptive reconfiguration.

20. The method of claim 11, further comprising reassigning, by the central controller, nodes of the wireless network operating as the first plurality of nodes, as the second plurality of nodes, or as the plurality of hybrid nodes when a routing distribution tree of the nodes of the wireless network changes.

* * * * *